United States Patent

[11] 3,604,514

| [72] | Inventor | Archie R. Gagne<br>R.R. 1, Box 146A, Saint Charles, Ill. 60174 |
|---|---|---|
| [21] | Appl. No. | 868,967 |
| [22] | Filed | Oct. 6, 1969 |
| [45] | Patented | Sept. 14, 1971<br>Continuation of application Ser. No.<br>624,071, Mar. 17, 1967, now abandoned. |

[54] PLOW WITH STRUCTURE FOR OSCILLATING PLOW SHARE AND MOULD BOARD
1 Claim, 4 Drawing Figs.

[52] U.S. Cl. .................................................. 172/40, 172/59, 172/102
[51] Int. Cl. ........................................................ A01b 11/00
[50] Field of Search ............................................ 172/40, 59, 110, 102

[56] References Cited
UNITED STATES PATENTS

| 66,958 | 7/1867 | Evarts | 172/110 X |
| 1,149,126 | 8/1915 | Gerhard | 172/110 X |
| 1,868,330 | 7/1932 | Martin | 172/110 X |
| 2,227,650 | 1/1941 | Imus | 172/102 X |
| 2,553,926 | 5/1951 | Lund | 172/40 X |
| 2,749,664 | 6/1956 | Chepil | 172/59 X |
| 3,146,832 | 9/1964 | Fry | 172/59 |
| 3,431,980 | 3/1969 | Singer | 172/40 |

FOREIGN PATENTS

| 680,859 | 1/1965 | Italy | 172/102 |

*Primary Examiner*—Robert E. Pulfrey
*Assistant Examiner*—Clyde C. Coughenour
*Attorney*—Richard C. Lindberg ABSTRACT: A plow for reducing the tractive effort required to move same through the soil by providing oscillating movement to the plow share and mould board.

INVENTOR
ARCHIE R. GAGNE
BY Richard C. Lindbergy
ATTORNEY

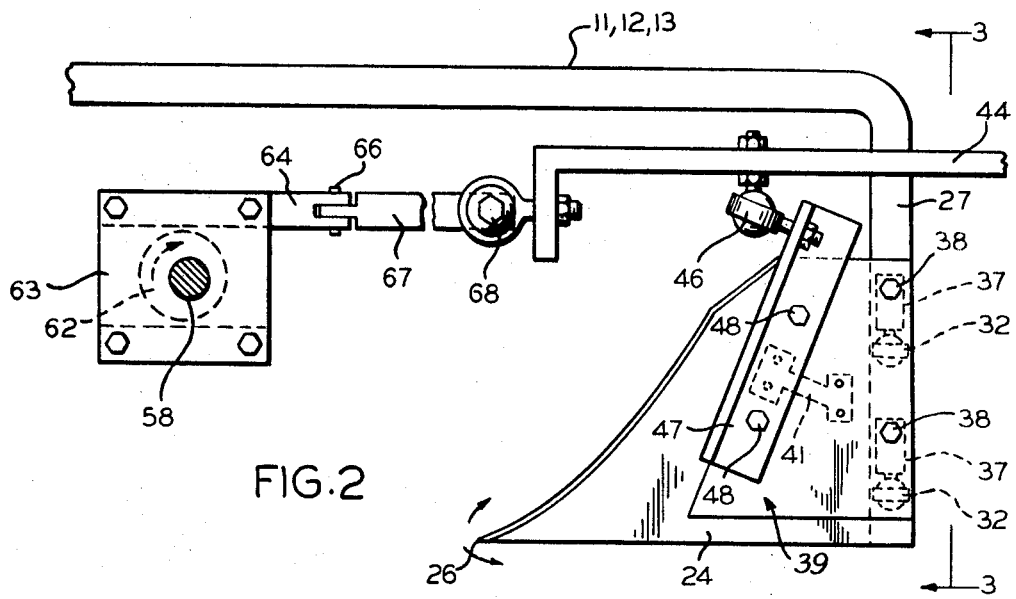
FIG. 2
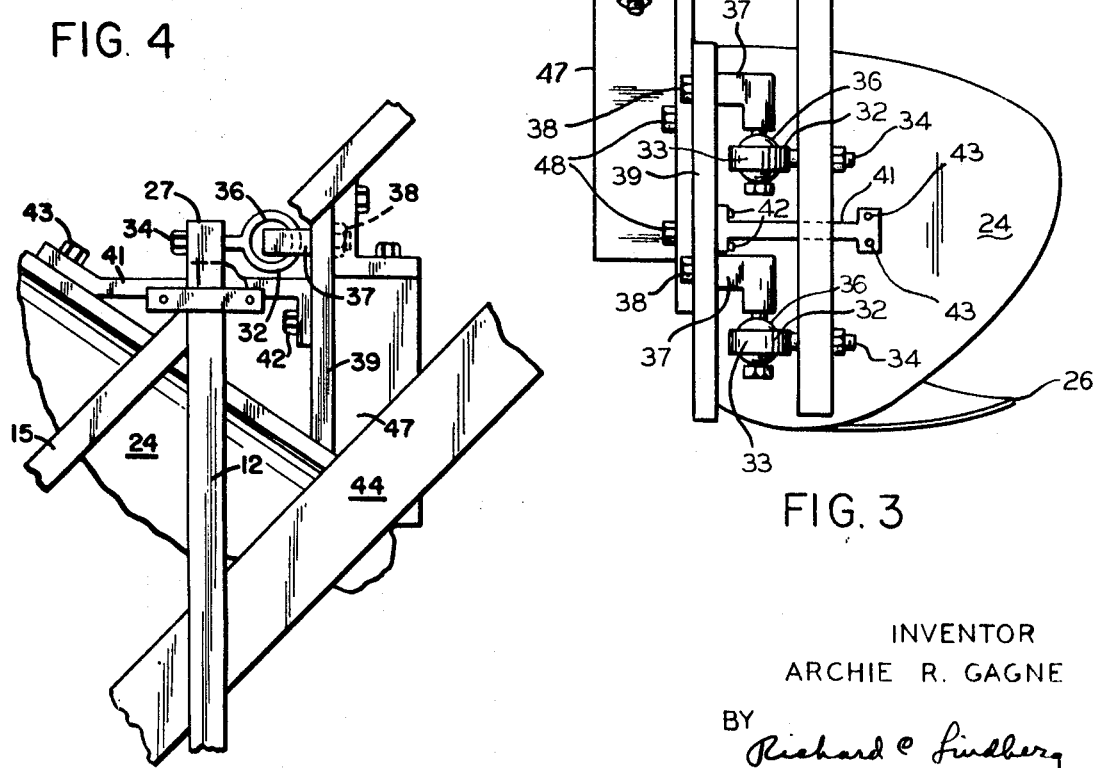
FIG. 4
FIG. 3
INVENTOR
ARCHIE R. GAGNE
BY Richard C. Lindberg
ATTORNEY

PLOW WITH STRUCTURE FOR OSCILLATING PLOW SHARE AND MOULD BOARD

This application is a continuation of my application Ser. No. 624,071, filed Mar. 17, 1967, now abandoned.

The structure according to the present invention is characterized by an oscillating bar connected to a plurality of plowshares and integral mold boards pivotally mounted to a nonoscillating frame, through the medium of frame-mounted ball joints connecting the oscillating bar and the plow shares to give oscillating movement to the plowshare tip in a horizontal plane.

THE PRIOR ART

The structure according to the present invention is an improvement over the structures shown in Evarts U.S. Pat. No. 66,958, Martin U.S. Pat. No. 1,868,330; Lund U.S. Pat. No. 2,553,926; Leo U.S. Pat. No. 3,167,134; German Pat. No. 659,252 and British PAT. No. 2,496/1,875.

It is a principal object of this invention to provide an improved plow characterized by structure for providing oscillating movement to the plowshare and mold board to minimize the draw bar pull required.

THE DRAWINGS

FIG. 2 is a side view of one of the plowshare and mold boards showing details of structure for imparting oscillatory movement thereto;

FIG. 3 is a rear elevational view thereof looking in the direction of the arrows 3—3 of FIG. 2; and FIG. 4 is a detailed plan view showing the manner of connecting one of the plowshares to the oscillatory structure.

Figure 1:
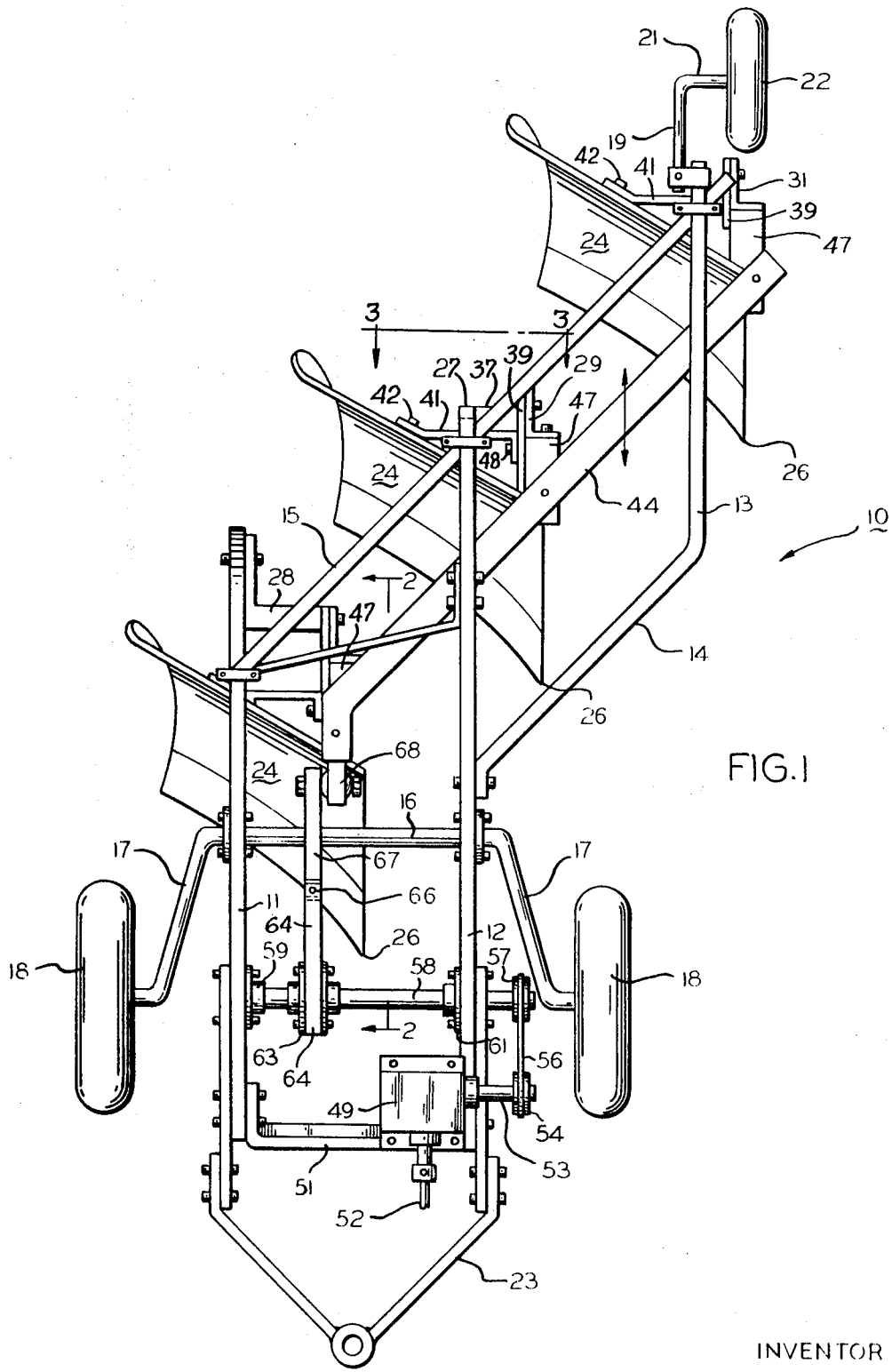
FIG. 1 is a plan view of a multibottom plow having structure according to the present invention embodied therein.

The improved plow and structure according to the present invention is referred to generally by the reference numeral 10 and includes a pair of spaced frame members 11 and 12 and an offset frame member 13, being jointed thereto by an angling frame member 14 thereof. A tie member 15 extends across the frame members 11, 12 and 13 at the ends thereof and is secured thereat in parallel relationship to the angling frame member 14.

Frame members 11 and 12 have a torsion axle 16 spanning the same, the axle 16 terminating at each end in trailing arms 17, each supporting a ground-engaging wheel 18. Structure may be provided for raising and lowering the frame members 11 and 12 with respect to the ground-engaging wheels 18, but such forms no part of the present invention, and accordingly is not shown.

Frame member 14 has an arm 19 secured to the end thereof, arm 19 being coterminous with a stub axle 21 having a ground-engaging wheel 22 mounted thereon.

The structure thus far described may be towed by a tractor, not shown, and a trail hitch 23 secured to the frame members 11 and 12 is accordingly provided.

As seen in FIG. 1, the plow 10 has a plurality of plowshare and mold board assemblies supported thereon for engagement in the soil being worked. These are denoted by the reference numerals 24 and each has a plowshare tip 26 adapted to enter the soil.

Each of the plowshare and mold board assemblies 24 is mounted for pivotal movement with respect to rigid essentially downward extensions 27 from the frame members 11, 12 and 13, a general showing of such extension being seen in FIGS. 2 and 3. Each such extension 27 may be part of a bracket assembly 28 secured to frame member 11, a bracket assembly 29 secured to frame member 12, or a bracket assembly 31 secured to frame member 31 for supporting the extension 27.

The frame extensions 27 provide a support for pivotal movement of mold board 24 with respect thereto, and as seen in FIG. 3, the extension 27 supports vertically spaced ball joints 32 consisting of a ball socket 33 secured at 34 to extension 27 and a ball 36 free to turn in socket 33. Each ball 36 is secured to an arm 37, the latter being secured by cap screws 38 to a strap 39 securing the arms 37 for swiveling movement together.

A connection 41 is provided between the strap 39 and the back of the mold board 24, connection 41 being secured by capscrew 42 to strap 39 and by screw 43 to mold board 24.

Structure is provided for giving oscillatory movement to the mold board 24 and plow tip 26, and consists of an oscillating arm 44 pivotally connected by a ball and socket 46 to an angle connector 47. The latter is connected by capscrew 48 to the strap 39.

Oscillatory movement is given to the arm 44 through the medium of a speed reducer 49 mounted on a cross frame member 51 extending between frame members 11 and 12. Speed reducer 49 has an input shaft 52 adapted to be connected to a power takeoff from a tractive vehicle, not shown, connected to the hitch 23. The components of motion of arm 44 are shown by the arrows thereon.

Speed reducer 49 has an output shaft 53 and a drive pulley 54 is fast thereon to drive a belt 56 and a driven pulley 57 fast on an eccentric shaft 58. The latter is journaled at one end in a bearing 59 on a frame member 11, and is also journaled in a bearing 61 on frame member 12.

As seen in FIG. 2, shaft 58 has an eccentric 62 fast thereto turning within an eccentric follower 63. A follower arm 64 adapted to move in a vertical plane only extends from follower 63 and is connected through the medium of a clevis connection 66 enabling a clevis arm 67 to have swiveling movement in a horizontal plane.

Clevis arm 67 is connected by a ball and socket joint 68 to the oscillating arm 44 which has the endwise movement seen in FIG. 1 to give the oscillating movement in the horizontal plane to the plowshare tips 26. By reason of the clevis connection 66 and ball and socket joint 68 the motion purely in a vertical plane of follower arm 64 can be resolved into the endwise oscillating movement of the arm 44 to give the oscillating movement previously described.

I claim:

1. In a plow having structure for imparting oscillating movement to the plowshare and mold board thereof to minimize the tractive effort required thereby, said plow having a frame having ground-engaging wheels thereon, mold board, said frame having at least one downward extension therefrom ;characterized by means providing a pivotal connection between said extension and said mold board, said pivotal connection comprising vertically spaced ball joints on said downward extension affording movement of said mold board in an horizontal plane only, an oscillating member moving with respect to said frame and having a pivotal connection to said mold board at a point spaced from the connection of said mold board to said downward extension, and means for oscillating said oscillating member comprising a driven shaft rotating along an horizontal axis, an eccentric fast on said driven shaft, an eccentric follower driven by said eccentric and a connection between said eccentric follower and said oscillating member whereby oscillatory movement is given to said oscillating member to give oscillatory movement to said mold board in an horizontal plane.